United States Patent [19]
Zito, Jr. et al.

[11] 3,920,474
[45] Nov. 18, 1975

[54] METHOD OF OPERATING A FUEL CELL USING SULFIDE FUEL

[75] Inventors: Ralph Zito, Jr., Westford; Lawrence J. Kunz, Jr., Fitchburg, both of Mass.

[73] Assignee: General Engineering Laboratories, Inc., Westford, Mass.

[22] Filed: May 25, 1972

[21] Appl. No.: 256,924

[52] U.S. Cl.............................................. 136/86 E
[51] Int. Cl................... H01m 31/00; H01m 27/04; H01m 27/30
[58] Field of Search ........................ 136/86 E, 86 R

[56] References Cited
UNITED STATES PATENTS

| | | | |
|---|---|---|---|
| 3,150,998 | 9/1964 | Reitemeier | 136/86 E |
| 3,252,837 | 5/1966 | Satterfield | 136/86 |
| 3,260,620 | 7/1966 | Gruber | 136/86 |
| 3,294,586 | 12/1966 | LeDuc | 136/86 |

FOREIGN PATENTS OR APPLICATIONS

| | | | |
|---|---|---|---|
| 1,212,387 | 11/1970 | United Kingdom | 136/86 E |

*Primary Examiner*—A. B. Curtis
*Assistant Examiner*—H. A. Feeley
*Attorney, Agent, or Firm*—Jerry Cohen; Charles Hieken

[57] ABSTRACT

A fuel cell with all-liquid feed and effluent is made feasible through the use of fuels comprising a liquid source of sulfide ion. The fuel cell comprises anolyte and catholyte compartments, and anode and cathode electrodes. The compartments are separated by an ion-transfer or mechanically porous membrane or the like. Gas producing reactions are suppressed through competing liquid product reactions.

9 Claims, 12 Drawing Figures

METHOD OF OPERATING A FUEL CELL USING SULFIDE FUEL

BACKGROUND OF THE INVENTION

The present invention relates to fuel cells. The various known categories of fuel cells include those having single or multiple electrolyte compartments and characterized by one or more of:

Liquid reagent input with solid, liquid or gaseous by-product output.

Solid reagent input with solid, liquid or gaseous by-product output.

Gaseous reagent input with liquid or gaseous by-product output. While fuel cells involving gaseous fuels and/or gaseous by-products have received the most attention in this field, the liquid-in/liquid-out system offers the promise of simplicity of design and reagent transport, and the absence of solid residues. Such a design can provide reliability and economy of utilization for a number of applications requiring a portable energy source.

Though functionally attractive, such systems pose developmental difficulties which include problems of diffusion of reactants across the porous barriers which are built into such devices to separate electrolyte compartments, the decreasing ratio of reactant to by-product in a recirculating electrolyte in the course of operation, and the necessity for high surface-area electrodes affording passageways for liquids.

It has been discovered, however, that a practical fuel cell, utilizing a liquid input and a liquid effluent in at least one half-cell compartment thereof can be made.

It is, therefore, an important object of the invention to provide a fuel-cell utilizing liquid input/liquid effluent in at least one — and preferably both — of its component half-cells.

It is a further object of the invention to provide a fuel cell affording a 1.0 volt or greater open circuit potential, consistent with one or more of the foregoing objects.

It is a further object of the invention to provide a fuel cell affording a power density of at least 1.0 watt per cubic inch of reaction chamber, consistent with one or more of the foregoing objects.

It is a further object of the invention to provide a fuel cell affording a power density of at least 20 watts per pound of reaction chamber, consistent with one or more of the foregoing objects. 50–200 or more watts per pound are realizable through the invention.

It is a further object of the invention to provide a fuel cell affording an energy density of at least 20 watt-hours per pound of reactants, and preferably in excess of 50 watt-hours per pound, consistent with one or more of the foregoing objects.

It is a further object of the invention to provide a fuel cell system utilizing fluids which are neither dangerous to persons nor expensive, consistent with one or more of the foregoing objects.

It is a further object of the invention to provide a fuel cell system producing a regenerable effluent, consistent with one or more of the foregoing objects.

It is a further object of the invention to provide a fuel cell system affording an effluent which is disposable in accord with practical technical and economic considerations, consistent with one or more of the foregoing objects.

SUMMARY OF THE INVENTION

In accordance with the present invention, a fuel cell is provided using a source of sulfide ion as fuel. The basic energy-producing reactions involved in such a cell will be, typically, as follows:

(With aqueous solutions of $Na_2S$ and $FeCl_3$ as anolyte and catholyte respectively in a two-compartment cell. The theoretical open circuit potential is 1.27 volts)

| | |
|---|---|
| $S^= \rightarrow \underline{S} + 2e^-$ | + 0.50 volts |
| $2Fe^{+++} + 2e^- \rightarrow 2Fe^{++}$ | + 0.77 volts |
| $S^= + 2Fe^{+++} \rightarrow \underline{S} + 2Fe^{++}$ | + 1.27 volts |

The sulfide ion is contained in a polar solvent preferably water. Sulfur is formed at the anode and goes into colloidal suspension in the anolyte. Settling of the solid and the attendant solid material handling problems are avoided. Some of the beneficial side reactions which may take place in such cells are: $\underline{S} + Na_2S \rightarrow Na_2S_2$; stepwise addition of $\underline{S}$ up to $Na_2S_5$ is possible $H_2S + 2 NaOH \rightarrow Na_2S + 2 H_2O$; where NaOH is added to the anolyte $$2 H_2S + O_2 \rightarrow 2 \underline{S} + 2 H_2O$$
$$H_2S + H_2SO_4 \rightarrow \underline{S} + 2 H_2O + SO_2$$
$$2 H_2S + SO_2 \rightarrow 3 \underline{S} + 2 H_2O$$

Hydrogen sulfide and sulfur dioxide gas formation is suppressed and solid sulfur formation is avoided by insuring an excess of sulfide or low polysulfide ions to solubilize solid sulfur.

In preferred and distinctly advantageous embodiments of the invention, dichromate ions are supplied to the catholyte region. The net energy producing reaction is:

$$3S^{--} + 14 H^+ + Cr_2O_7^{--} \rightarrow 3\underline{S} + 2Cr^{+++} + 7H_2O$$
1.85 volts gas formation is suppressed by competing solid or soluble solid product side reactions.

In some embodiments of the invention, the fuel, and preferably both fuel and oxidizer, are fed, in liquid form, through porous anode and cathode structures while reaction products are similarly removed.

The fuel supply system is designed to contain more solid sulfide than will dissolve in the solvent provided. As the cell is operated and the anolyte solute is depleted, it is replaced by newly dissolving solute. Only when the excess solid is all in solution does the fuel concentration begin to decrease seriously. This design greatly reduces the parasitic weight of solvent. In order to limit polarization effecting phenomena, it is desirable to agitate the cell fluids or otherwise provide for a constant rapid interchange of fluids at the electrode-electrolyte interface. This is preferably accomplished by mere circulation of the fluids through narrow electrolyte compartments. The use of narrow electrolyte compartments also helps limit internal resistance losses and permits achievement of higher power density in multiple cell arrays. Depending on the current densities required, the recirculation of the electrolytes is accomplished at rates higher than the minimum rate necessary to supply fuel, in order to limit polarization phenomena. Over-pumping results in a smaller normality change ($\Delta N$) of the fuel per pass through the cell, and it provides the desirable turbulence at the electrode surface which ensures efficient interchange of fuel and waste at this interface. It also provides for sufficient excess sulfide ion in the vicinity of the anode to solubilize the sulfur being formed.

Small electrolyte compartment thickness -- less than .100 inch thickness normal to the electrode surface and the electrolyte flow plane -- enhances the beneficial effects of over-circulation and thicknesses of about .020 inch are particularly desirable. Upper limits on circulation rates are set by the requirements of laminar flow in the supply lines and manifolds to avoid wasted pump power. Overcirculation, in conjunction with a heat exchanger, can provide beneficial cooling of the cell.

In addition to chromic acid and ferric chloride already mentioned, the catholyte solutions may also comprise persulfates, acids, hydrogen peroxide, metal containing oxidizers such as permanganate or any strong or moderately strong oxidizing agent. If heavy metal ions are present in the catholyte, their diffusion across the barrier to the anolyte compartment will result in the formation of their sulfides which, if insoluble, must be limited to amounts which will not cause clogging of the barrier. A limited amount of barrier filling may be useful where more porous barriers are used.

Selection of an oxidizer for the system involves considerations of the specific energy and power requirements of the end use, balanced against the degree of importance placed on safety, converter life and ease of operation. For instance, an aqueous hydrogen peroxide/sulfuric acid mixture as an oxidizer for sodium monosulfide affords 180 watt-hours per pound available specific energy of reactants. After accounting for the parasitic weight of solvent, fuel cell and power train, the accepted nominal 100 watt-hour per pound requirement for electric vehicles can be met. In other applications, the low cost, safety and stability of ferric chloride make it the best choice for catholyte material.

Still other features, objects and advantages will be apparent to those skilled in the art from the foregoing general summary or from the following detailed description taken in conjunction with the accompanying drawings wherein:

DETAILED DESCRIPTION OF PREFERRED EMBODIMENTS

Figure 1:
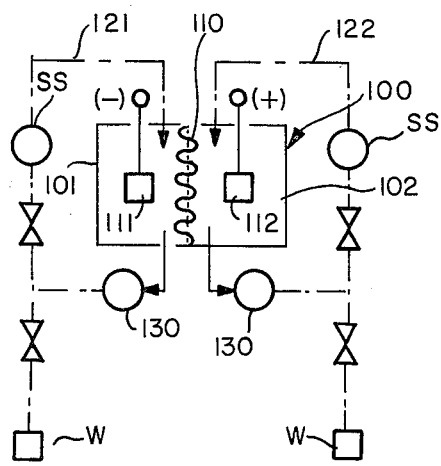
FIGS. 1, 1A and 1B are diagrammatic sketches of two embodiments of the invention in a single cell and bipolar array form.
Figure 2:
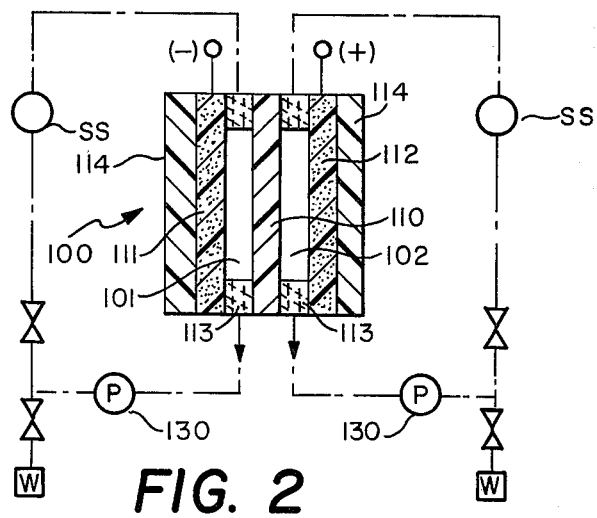
FIGS. 2, 3 and 4 are more detailed sketches, in cross section, corresponding to FIGS. 1, 1A and 1B.

Referring to FIGS. 1 and 2, there is shown a preferred embodiment of the fuel cell 100 comprising anolyte and catholyte compartments 101 and 102, respectively, formed by the separation of each cell into two compartments by an intermediate barrier 110. This cell has an anode 111 and a cathode 112. Each compartment is bound by plexiglas or polycarbonate strips or spacers 113 of 1/4 inch thickness, through which are drilled holes for feeding electrolyte into and withdrawing effluent from the cell. Plexiglass sheets 114, or a container of polyvinyl chloride complete the package. Pumps 130 recirculate the electrolytes and, if desired, recirculation can be replaced by once-through feed from fuel storage tanks SS with effluent going to waste tanks W. Gaskets or adhesive sealant can be provided immediately between the electrodes, spacers and barriers. Many such cells can be arranged back-to-back in series with intercell electrical connections well known in the art, all but the terminal electrodes serving as bipolar electrodes in a design arrangement known per se. The electrodes can be fabricated with sufficient stiffness to obviate the need for reinforcement within or between cells.

Figure 3:
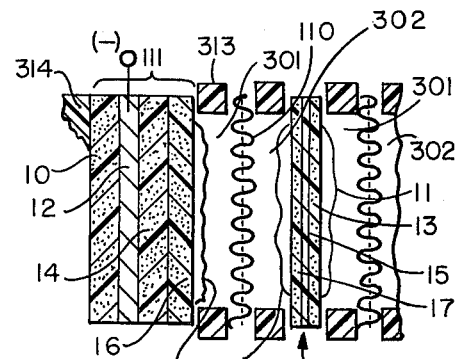

In this preferred embodiment, the anode 111 and cathode 112 are of common design. The anode, for example, comprises 2 or 3 sub-assembly layers based on conductive substrate sheets which are made from a mixture of 60% graphite powder and 40% polyvinylidene fluoride resin pressed into a sheet at 400°F and 316 psi. As shown in FIG. 3, a metal screen 12, is laminated between two such conductive substrates, 10 and 14. The screen is preferably a perforated and expanded copper sheet of about 0.010 inch thickness. Particles of active carbon are pressed into the surface of a further conductive substrate forming a surface layer, 18. By spreading on a layer of particles and hot-pressing in a confined mold, a 1 – 2 particle thick surface layer is formed. These two sub-assemblies are then pressed together to form the electrode structure 111. For all these operations, a suitable release agent or tetrafluoroethylene sheets are used to facilitate removal of the part from the mold or platen.

The following electrode preparation conditions have been used to good effect. A mixture of 60 percent by weight Dixon 1112 graphite and 40 percent Kynar brand RC-3584 or No. 451 polyvinylidene fluoride resin, broken together through a 40 mesh screen is blended for six minutes in a Patterson-Kelly blender which tumbles the mixture across the path of impacter blades. The mix is troweled into 1/8 inch layers which are preheated to 400°F, pressed for 7 minutes at 350 psi and 400°F, and finally cooled at the same pressure to room temperature. The resultant product is about 0.030 inch thick and has a volume resistivity of about 0.08 ohm-inch.

A metal screen, Exmet No. 5 cu 7-4/0-flattened, is laminated between two such conductive substrates at 400°F and 105 psi to produce a laminate subassembly.

In a confined mold, a 1/8 inch thick layer of active carbon (Darco brand 20 × 40 mesh or Calgon Corp. OL 20 × 50 mesh) is troweled onto another conductive substrate which is then preheated to 350°F, hot pressed at 350°F and 350 psi for 3 minutes and cooled to room temperature at the same pressure. The resultant product is an electrode surface sub-assembly with a 1 – 2 particle thick active surface firmly bonded to the conductive substrate. The two sub-assemblies are then preheated to 400°F pressed together at 400°F and 105 psi for 2 minutes and cooled at 70 psi to avoid screen distrotion, the final product being a terminal electrode 111.

The terminal electrodes of a bipolar array (both electrodes of a single cell) must carry current along the plane of the electrode. The screen provides a low resistivity for this long path and facilitates connection to the load. The intermediate electrodes of a bipolar array only carry current normal to the plane of the electrode; this short path makes the higher resistivity of the conductive substrate acceptable. In making these bipolar electrodes, two electrode surface sub-assemblies are laminated about an ordinary conducitve substrate. With care, the carbon particles themselves may be applied to both surfaces of a single conductive substrate eliminating excess weight and resistance.

The porous barrier 110 can be a gelled ion-transfer membrane (Ionics, Inc.) or a simple microporous barrier of polyethylene (Daramic brand, W.R. Grace) or rubber (Ace-Sil, Amerace-Esna Co.).

Sub-micron pore sizes afford a good balance between diffusivity and electrical resisitivity. The use of a combination of barriers can further optimize the balance of these properties.

The anolyte must provide a source of sulfide ion in solution. This end will ordinarily be realized through aqueous solutions of alkali metal sulfides, but the use of non-aqueous polar solvents are within the broadest scope of the invention. The cation of the anolyte material and the reduced anion of the oxidizer should not form a salt which is insoluble in the spent anolyte; alkali metal sulfides are favored in this respect. Sodium and potassium monosulfides ($Na_2S$, $K_2S$) are distinctly advantageous; the sodium salt is more readily available in mono form and is more well behaved in many respects.

The volume resistivity of sodium sulfide and ferric chloride solution were determined using a cell with 3 square inch carbon coated electrodes with a separation of 0.31 inch. Resistivities are tabulated below.

| Sodium Sulfide | | | Ferric Chloride | | |
| --- | --- | --- | --- | --- | --- |
| 4N | 1.46 | ohm-in | 4N | 9.8 | ohm-in |
| 3N | 1.54 | ohm-in | 3N | 5.5 | ohm-in |
| 2N | 2.05 | ohm-in | 2N | 2.95 | ohm-in |
| 0.2N | 12.0 | ohm-in | 1N | 2.87 | ohm-in |
| | | | 0.1N | 9.8 | ohm-in |

Sodium sulfide solutions were found to decrease in resistivity with increasing concentration — saturation and minimum resistivity occurring at 4–5N. Ferric chloride exhibits the high resistivity for both dilute and concentraded solutions characteristic of this type of salt; minimum resistivity occurs near 1N and the practical electrolyte range, consistent with minimization of the parasitic weight of solvent, is from about 2.5 – 3.5N. Conductivity enhancing additives can extend this range. The addition of a second salt to the anolyte to enhance conductivity is desirable. If the additional salt also makes the anolyte more basic, the formation of hydrosulfide ion ($SH^-$) by hydrolysis is suppressed. Alkali metal hydroxides serve this end well. The addition of one percent NaOH was found to enhance performance and efficiency. The sulfide solution should be 2–5N through most of the operation cycle and should preferably be saturated at the start with excess solid sulfide available for maximum weight efficiency.

Where elemental sulfur is formed at the anode, in the energy producing reaction, it tends to be colloidal in the absence of excess sulfide ion with some tendency to settle out at boundry surfaces including the barrier. In cells which require long life, it is desirable to suppress the accumulation of free sulfur. Various chemical or mechanical means can be employed to remove sulfur from solution but the following techniques are preferred and distinctly advantageous.

The anolyte composition itself provides the major counter measure to sulfur formation. Solutions of sulfide ions are capable of dissolving elemental sulfur according to the equation

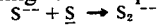

Polysulfide ions up to $S_5^{--}$ are possible, indicating that a 25–30% excess of sulfide reagent can solublize all of the sulfur produced in the course of cell operation. A recirculating electrolyte makes best use of this property of sulfide ions, and a flow rate in excess of the minimum rate necessary to sustain the current density assures the presence of excess sulfide ions to dissolve the waste sulfur.

Hydrogen sulfide gas formation is suppressed by keeping the anolyte alkaline as noted above. Any hydrogen sulfide formed by diffusion of sulfide ions to the catholyte compartment is readily oxidized by the oxidizing agent to free sulfur and $SO_2$ which is water soluble. Though some solid sulfur is formed, the generation of poisonous $H_2S$ is effectively suppressed. Similarly, oxidizers comprising heavy metals (permangamate, dichromate, etc.) will form insoluble sulfide salts with any sulfide ions which reach the catholyte by diffusion. The solids may be filtered, allowed to settle (where large fuel tanks are used) or simply ignored; the small quantities produced during an average run have had no deleterious effect on performance.

Figure 1A:
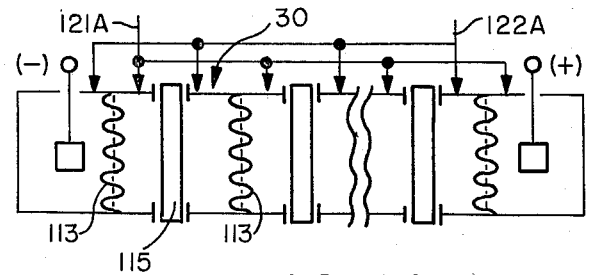

FIGS. 1A and 3 shown a portion of a multi-cell series array based on the unit cell species depicted in FIGS. 1 and 2. The barrier 110, and terminal electrodes 111 and 112 of FIG. 2 are used here — anode 111 being shown here with its layered components. Bipolar electrode 115 consists of two electrode surface sub-assemblies — 11, 13 and 19, 17 — bonded to an ordinary conductive substrate 15.

Figure 1B:
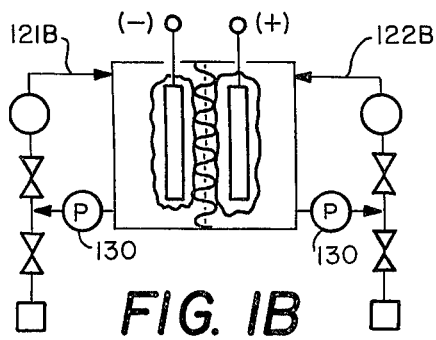
Figure 4:
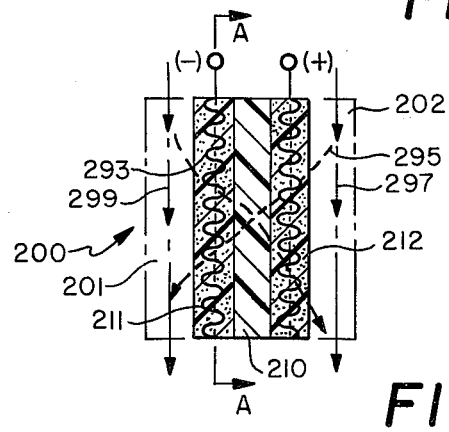
Figure 4A:
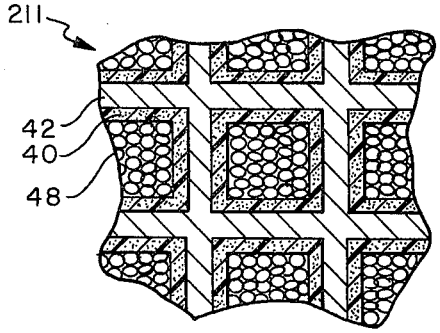
FIG. 4A is a broken-out portion of FIG. 4

FIGS. 1B, 4 and 4A demonstrate a second species in unit cell form 200. The porous anode 211 and cathode 212 comprise central metallic screens and are contiguous with a barrier similar to 110 of FIGS. 1 and 2. The electrolytes are fed (arrows 297 and 299) to the electrodes from anolyte and catholyte compartments 201 and 202 which are outside the electrode-barrier-electrode assembly. Ion transport is represented schematically by dashed arrows 293 and 295. FIG. 4A shows electrodes 211 and 212 as comprising metal screens 42 coated at 40 with a conductive/protective mix. Active carbon particles 48 corresponding to active carbon surface on electrodes 111, 112 are bonded about this protected screen to provide a porous electrode with high surface area and low resistance paths to the metal screen. This embodiment minimizes diffusion losses across the barrier since fuel and oxidizer are consumed as they encounter the barrier; it also minimizes IR losses since interelectrode spacing is kept to a minimum. Since the electrodes of this embodiment are fed from behind, a bipolar array is not possible, and a series array must rely on external connections between cells with their attendant inefficiencies.

Each of the above described species can be realized in various cylindrical, spiral-wrap, or other extended electrode area arrangements, known per se in the art.

Figure 5:
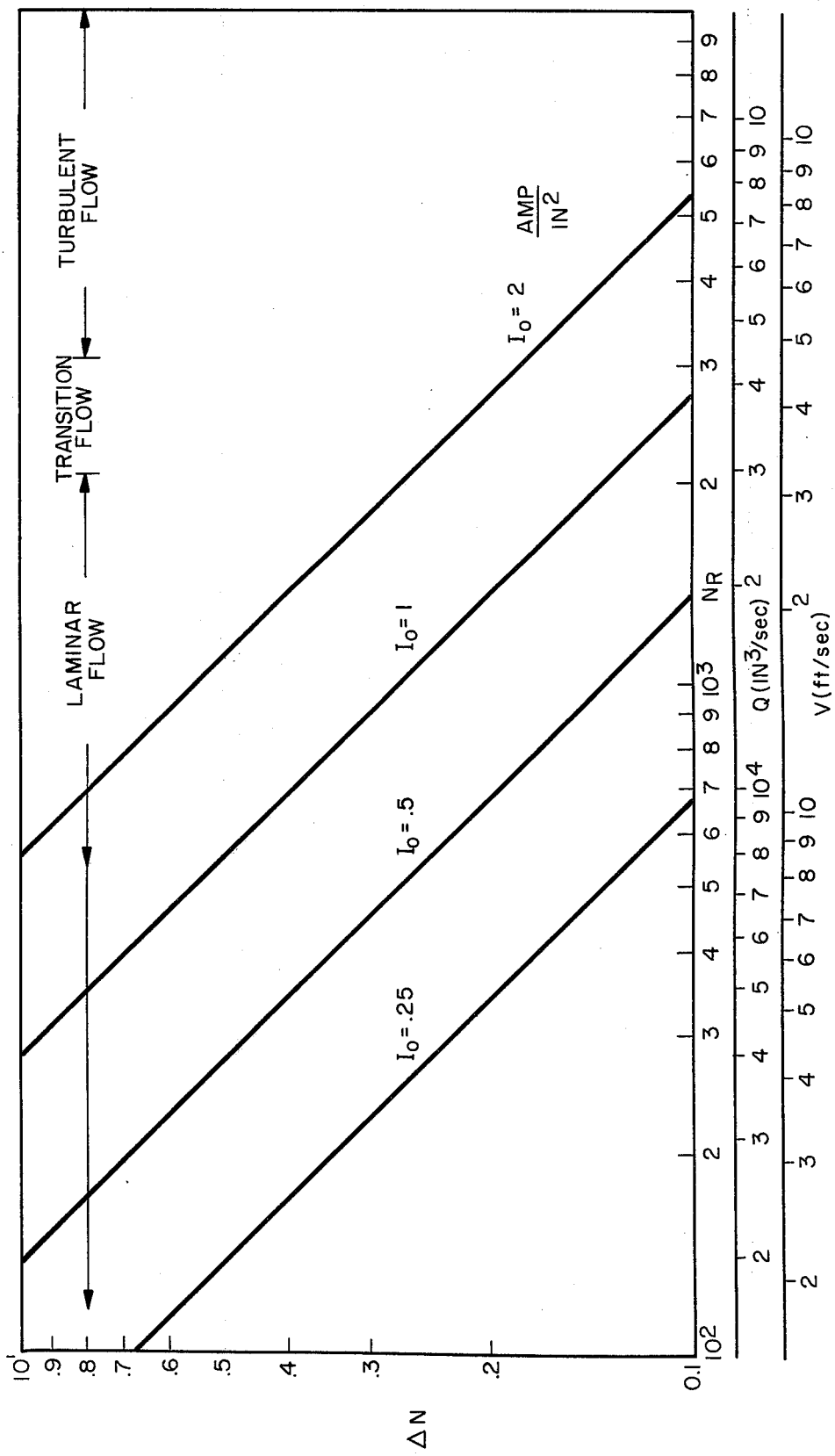
FIG. 5 illustrates electrolyte flow characteristics as a function of normality change per pass for several current densities.

FIG. 5 illustrates the flow requirements for operation of a 60 in² cell. Reynolds Number, flow rate, and velocity are indicated as a function of the normality change of the electrolyte ($\Delta N$) per pass and current density ($I_o$) according to the equation $$Q^o = \frac{I_o A}{F \Delta N}$$

where
$Q^o$ = fluid flow, liters/sec $I_o$ = current density, amp/in$^2$
$A$ = cell area, in$^2$
$F$ = Faraday's Number
$\Delta N$ = change in normality of electrolyte per pass
The model is a 60 in$^2$ prototype fuel cell with the limiting flow determined by two feed tubes 1/16 inch by 1/16 inch in parallel. It is a design criterion to hold flow rates to the laminar regime to limit pumping power losses.

EXAMPLES

The following non-limiting examples are illustrative of the practice of the invention in various specific embodiments thereof. Examples 1–5 describe early experimental data which were obtained using a single static fuel cell apparatus comprising a chamber separated into anolyte and catholyte compartments by a barrier of microporous polyethylene, (W.R. Grace Company's *Daramic* brand separator). Flat rectangular electrodes were fabricated from the materials indicated in each example. The electrodes were based on either copper screen or Grafoil brand (Union Carbide) graphite sheet as indicated. A conductive/protective bonding coat of 50% carbon black and 50% polyvinylchloride was applied by dipping in a solution of the above in methyl ethyl ketone. The surface materials as indicated were applied while the bonding coat was still wet.

The fuel cells of examples 6,7,8,9, and 11 were made in accordance with FIGS. 1 and 2; the electrode area was 16 in$^2$ and the separation was 0.130 inch. In these larger cells, electrolyte recirculation was accomplished at rates as indicated and reagent utilization was determined as described in example 6.

The fuel cell of example 12 was fabricated like those of example 6 except that the electrode area was 1 in$^2$ and a continuous life test was performed on it.

The tests reported in example 10 were performed in a static cell with 4 in$^2$ electrodes prepared in accordance with FIGS. 1 and 2.

EXAMPLE 1

The anode was prepared by spreading 6–14 mesh coconut charcoal onto the carbon black/PVC bonding coat on Grafoil as described above. The cathode was prepared by applying MnO$_2$ powder in the same manner to a second coated sheet. The anolyte was a saturated aqueous solution of technical grade sulfurated potash (potassium polysulfide — $K_2S_x$). The catholyte was saturated aqueous sodium dichromate plus about 30% sulfuric acid, chromic acid being formed in solution. The initial potential of the cell was 1.946 volts. Current was drawn at different rates through resistive loads. Load voltage ($V_L$, volts) and current (I, amps) measurements made during the test are tabulated below.

|   | After 2 sec. | After 15 sec. | After 60 sec. | $V_{oc}$ After 3 sec. Recovery |
|---|---|---|---|---|
| I | 0.26 | 0.258 | 0.257 | 0 |
| V | 1.81 | 1.81 | 1.80 | 1.93 |
| I | 0.58 | 0.58 | 0.56 | 0 |
| V | 1.67 | 1.65 | 1.60 | 1.90 |
| I | 1.00 | 1.00 | 1.00 | 0 |
| V | 1.40 | 1.20 | 1.11 | 1.80 |

EXAMPLE 2

The experiment of example 1 was repeated using a 0.250 inch carbon felt pad (from Fibre Materials Company) as an anode surface instead of the coconut charcoal of example 1. The initial potential of the cell was 1.870 volts.

The cell was operated as in example 1 with the results tabulated below.

|   | After 2 sec. | After 15 sec. | After 60 sec. | $V_{oc}$ After 3 sec. Recovery |
|---|---|---|---|---|
| I | 0.25 | 0.25 | 0.25 | 0 |
| V | 1.724 | 1.724 | 1.713 | 1.86 |
| I | 0.566 | 0.564 | 0.549 | 0 |
| V | 1.555 | 1.520 | 1.470 | 180 → 1.85 after 30 sec. |
| I | 1.00 | 1.00 | 1.00 | 0 |
| V | 1.20 | 0.98 | 0.90 | 170 → 1.83 after 30 sec. |

EXAMPLE 3

The anode of example 1 (coconut charcoal) was used with a cathode consisting of a carbon felt pad (as in example 2) bonded to a copper screen coated with the usual bonding coat. Electrolytes were the same as in examples 1 and 2 except that a few drops of "Alkanol" surfactant were added to the catholyte to facilitate wetting of the felt pad. Initial potential of the cell was 1.980 volts. Test results are tabulated below.

|   | After 2 sec. | After 15 sec. | After 60 sec. | $V_{oc}$ After 3 sec. Recovery |
|---|---|---|---|---|
| I | 0.325 | 0.327 | 0.326 | 0 |
| V | 1.800 | 1.804 | 1.800 | 1.98 |
| I | 0.64 | 0.66 | 0.656 | 0 |
| V | 1.58 | 1.63 | 1.61 | 1.96 → 1.98 after 15 sec. |
| I | 1.00 | 1.00 | 1.00 | 0 |
| V | 0.85 | 0.90 | 0.88 | 1.93 → 1.955 after 15 sec. |
| I | 1.500 | 0.93 | 1.02 | 0 |
| *V | 0.48 | 0.37 | 0.40 | 1.92 → 1.95 after 15 sec. |

*As the test progressed at higher current, the cell voltage was actually observed to rise with time.

EXAMPLE 4

The anode of example 1 (coconut charcoal) was used with a cathode of graphitized cloth (from Fibre Materials Corporation) bonded to grafoil by the usual conductive bonding coat. The initial potential was 1.95 volts. Performance is tabulated below.

|   | After 2 sec. | After 15 sec. | After 60 sec. | $V_{oc}$ After 3 sec. Recovery |
|---|---|---|---|---|
| I | 0.320 | 0.316 | 0.313 | 0 |
| V | 1.815 | 1.790 | 1.780 | 1.93 |
| I | 0.62 | 0.52 | 0.57 | 0 |
| V | 1.63 | 1.37 | 1.50 | 1.91–1.93 |
| I | 1.00 | 0.85 | 0.666* | 0 |
| V | 1.25 | 0.59 | 0.46 | 1.88 |

*After three minutes of continuous drain,
I = 0.78 amp.
V = 0.54 volts

EXAMPLE 5

The electrodes of example 1 were tested again to determine if there were any degradation of the electrolytes in the course of examples 1–4.

The initial potential was 1.910 volts. Data is tabulated below.

|   | After 2 sec. | After 15 sec. | After 60 sec. | $V_{oc}$ After 3 sec. Recovery |
|---|---|---|---|---|
| I | 0.270 | 0.265 | — | 0 |
| V | 1.78 | 1.76 | — | 1.89 |
| I | 0.63 | 0.60 | 0.545 | 0 |
| V | 1.65 | 1.56 | 1.41 | 1.82 (slow increase) |
| I | 1.00 | 1.00 | — | — |
| V | 1.35 | 0.59 | — | — |

EXAMPLE 5A

Experiments similar to those reported in examples 1–5 with the addition of a provision for electrolyte recirculation afforded continuous performance at levels comparable to the 15 second performance level reported in example 1–5 for the greater part of the fuel utilization, indicating that recirculation can substantially suppress polarization phenomena.

EXAMPLES 6–7

Figure 6:
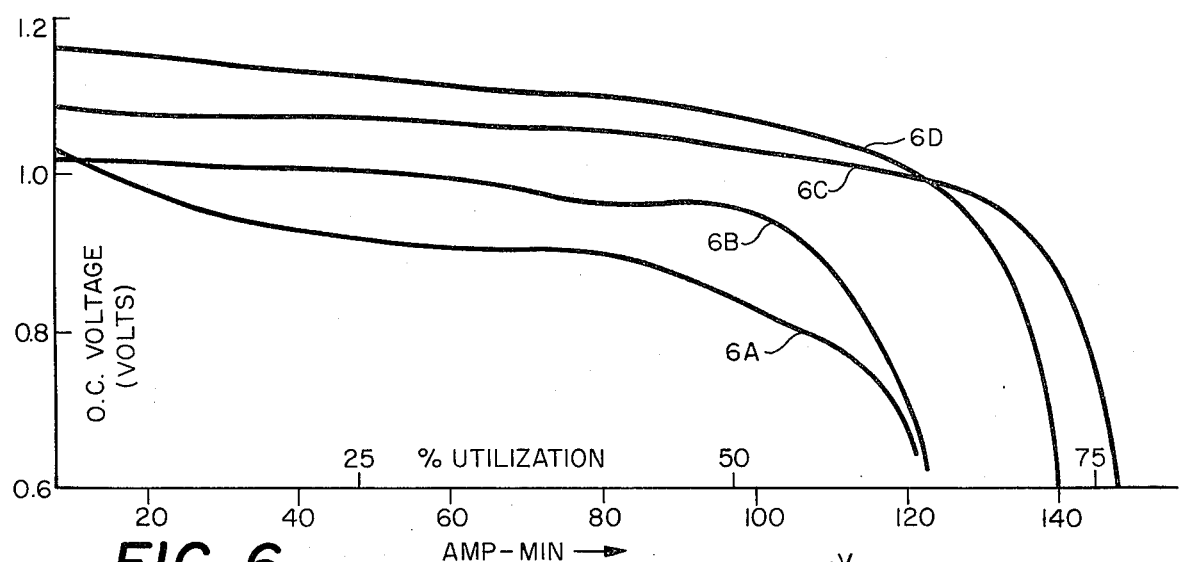
FIGS. 6 – 8 are empirical data explained in the corresponding examples.
Figure 6A:
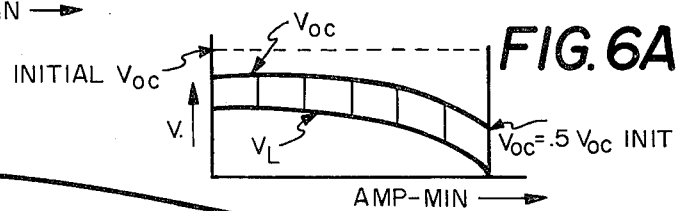
Figure 7:
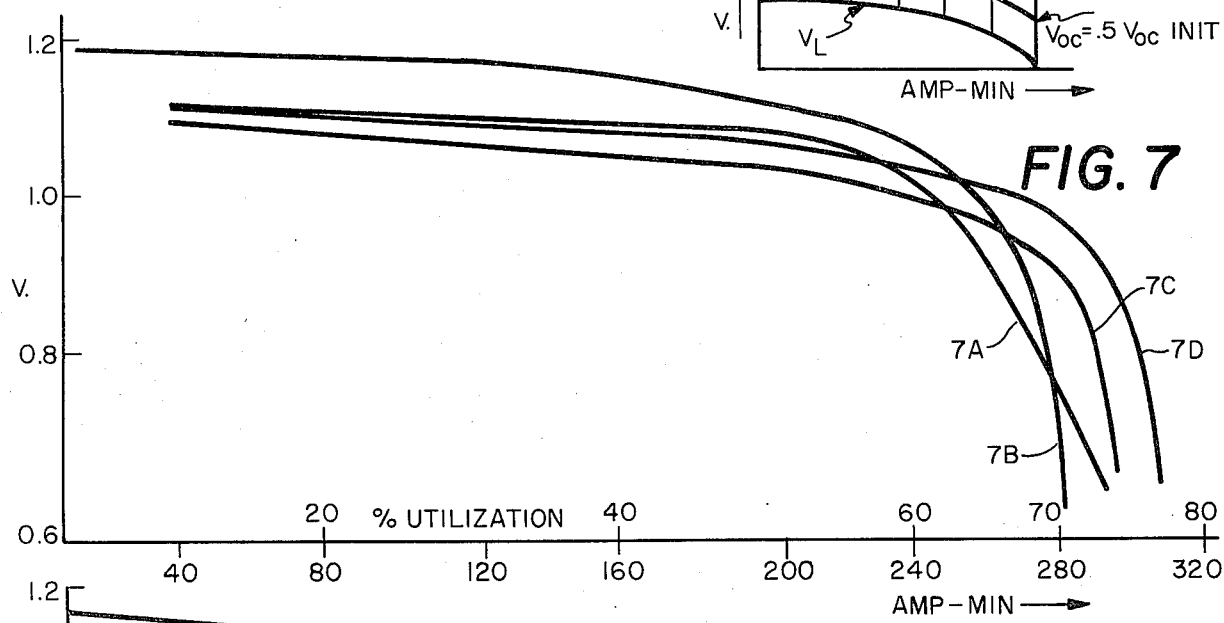

A cell was prepared as described in conjunction with FIGS. 1 and 2 using a 2 Normal aqueous sodium monosulfide anolyte and a 4 Normal aqueous ferric chloride catholyte. The anode surface material (18 in FIG. 3) was 20–40 mesh Darco brand active carbon (ICI, America); the cathode surface material was 20–50 mesh OL active carbon (Calgon, Inc.). The electrode area was 16 in² and the interelectrode spacing was 0.130 inch. The initial electrode potential was 1.35 volts. The cell was operated through a full cycle several times at different current densities. A full cycle comprises operation of the cell through a current regulated load on a measured amount of fuel. The circuit is interrupted periodically for one second and the instantaneous open circuit potential or driving potential $V_D$ is measured. The load voltage, $V_L$, includes IR losses and is otherwise measured continuously. The fuel is considered spent* when the driving potential has dropped 50% from its initial value. The energy realized to this point is compared with the initial charge of fuel and is reported as percent Reagent Utilization. FIGS. 6 and 7 show the dependence of sodium sulfide Reagent Utilization (RU) on current density ($I_o$) for different initial concentrations of Na₂S. That information is tabulated below.

*The reagent not being tested is normally supplied in excess

| 2N Sodium Sulfide (FIG. 6) Curve | $I_o$, amp/in² | RU % |
|---|---|---|
| 6D | .100 | 70 |
| 6C | .250 | 74 |
| 6A | .375 | 64 |
| 6B | .500 | 73 |

| 4N Sodium Sulfide (FIG. 7) Curve | $I_o$, amp/in² | RU % |
|---|---|---|
| 7B | .100 | 68 |
| 7C | .250 | 73 |
| 7D | .375 | 72 |
| 7A | .500 | 73 |

EXAMPLE 8

Figure 8:
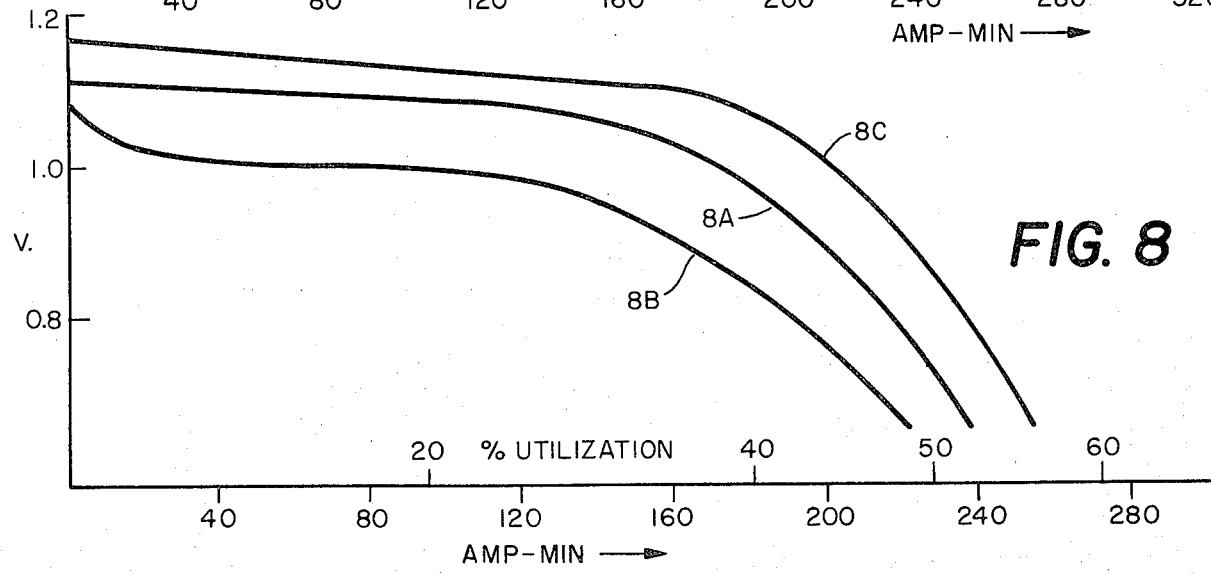

A cell similar to those of examples 6 and 7 was used for these tests except that both electrodes were surfaced with 20–40 mesh Darco brand active carbon. Reagent Utilization of 6.7 N hydrogen peroxide in 20% $H_2SO_4$ was determined at 0.5 and 1.0 amp/in² and again at 0.5 amp/in² with the addition of NaOH to the anolyte. The results are pictured in FIG. 8 and tabulated below:

| 6.7N Hydrogen Peroxide/20% $H_2SO_4$ (FIG. 8) Curve | $I_o$, amp/in² | RU% |
|---|---|---|
| 8A | 0.5 | 53 |
| 8B* | 0.5 | 56 |
| 8C | 1.0 | 49 |

*1% NaOH added to anolyte

EXAMPLE 9

Reagent Utilization for various hydrogen peroxide catholyte compositions was measured with respect to sodium sulfide at 0.5 amp/in² in a 16 in² cell similar to that of example 8. The results are tabultated below.

|   | Hydrogen peroxide Reagent Utilization - % $H_2SO_4$ | | |
|---|---|---|---|
|   | 50% | 30% | 20% |
| 5% $H_2O_2$ | 39% | — | 48% |
| 10% $H_2O_2$ | 53% | 53% | 56% |

EXAMPLE 10

In a cell similar to those of examples 6 and 7, but having 4 in² carbon electrodes, various solutions containing hydrogen peroxide were tested as oxidizers for sodium sulfide. Hydrogen peroxide was added stepwise to the catholyte solution under test and the initial open circuit potential, $V_{oc}$, and the driving potential, $V_D$, for 0.25 amp/in² (instantaneous open circuit potential from load condition) were observed for each addition. The solutions tested were: sulfuric acid — 50, 20 and 5%; 10% NaOH; 10% NaCl and 4N NaHSO₄.

The tests showed that about 8% wt/vol hydrogen peroxide gave a level of performance which was exceeded by only a few percent with further addition. Best performance was given in 20–50% sulfuric acid. This means that high peroxide concentrations need only be present in the peroxide storage tank, where decomposition will be slow. Peroxide can be added to a limited volume of sulfuric acid electrolyte as needed, minimizing both the parasitic weight of electrolyte and the loss of oxidizer due to decomposition.

EXAMPLE 11

Ferric chloride Reagent Utilization was measured as in examples 6 and 7 except that sodium sulfide was supplied in excess. The results are tabulated below for the concentrations and current densities indicated.

| FeCl₃ Concentration | $I_o$, amp/in² | RU% |
|---|---|---|
| 4N | 0.50 | 98 |
| 4N | 0.25 | 80 |
| 2N | 0.50 | 91 |
| 2N | 0.25 | 89 |

EXAMPLE 12

A life test over 100 hours was performed on a recirculating cell similar to that of example 6 but of 1 in² electrode area. Sodium sulfide and ferric chloride electrolytes were used. Due to uneven flow in the small cell, solids (FeS) built up in the catholyte compartment after three days. Adequate flow and the use of a less porous separator can eliminate the problem.

It is evident that those skilled in the art may make numerous modifications and uses of and departures from the specific embodiments described above without departing from the inventive concepts hereof. Accordingly, it is intended that the invention shall be construed as embracing each and every novel feature and novel combination of features present in or possessed by the apparatus or process herein described and that the foregoing disclosure shall be read as illustrative and not as limiting except to the extent set forth in the claims appended hereto.

What is claimed is:

1. A method of operating fuel cell including an anode and cathode containing graphite-plastic conductive substrates coated with active carbon particles, an anolyte and catholyte compartment and ion exchange means interconnecting said anolyte and catholyte compartments, said anolyte comprising a liquid source of monosulfide ion in a concentration in excess of one normal during a portion of electrochemical cycling, said catholyte comprising a liquid oxidizing agent, comprising the steps of flowing said anolyte into and out of said anolyte compartment at a rate and concentration to maintain sulfide ions in excess of polarization preventing concentration to dissolve free sulfur formed in the course of electrochemical action of the cell and flowing said catholyte into and out of said catholyte compartment to produce a drain rate of about 1.0 volt and above 0.5 ampere per square inch.

2. A method as set forth in claim 1 wherein
said flowing means recirculate effluent anolyte and catholyte back to their respective compartments.

3. A method as set forth in claim 2 wherein
said catholyte is acidic and the anolyte is basic.

4. A method as set forth in claim 3 wherein
said catholyte comprises ferric chloride.

5. A method in accordance with claim 2 wherein
said anolyte is saturated with sulfide solute and comprises additional solid sulfide available for later dissolving.

6. A method as set forth in claim 3 wherein
said catholyte comprises hydrogen peroxide mixed with a 20–50% sulfuric acid solution, and
a hydrogen peroxide source of higher concentration than the hydrogen peroxide in the catholyte compartment.

7. A method as set forth in claim 2 wherein
said source of sulfide ion is a solution of sulfide salt in a polar solvent of at least 2.0 normality and no greater than 5.0 normality.

8. A method as set forth in claim 7 wherein
said polar solvent is water and said dissolved salt comprises an alkali metal sulfide.

9. A method as set forth in claim 8 wherein
said dissolved salt comprises sodium monosulfide.

* * * * *